March 26, 1929. W. W. WILSON 1,706,430
WELL SCREEN MANUFACTURE
Filed April 26, 1927
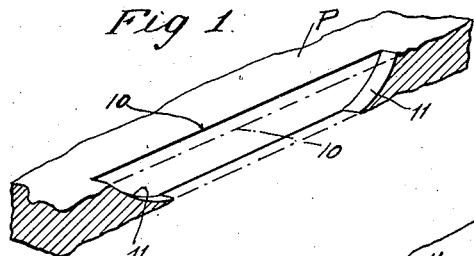
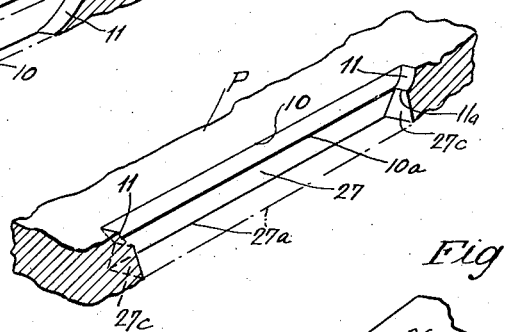
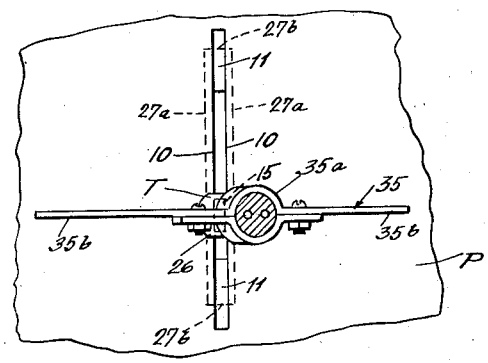
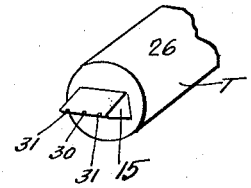
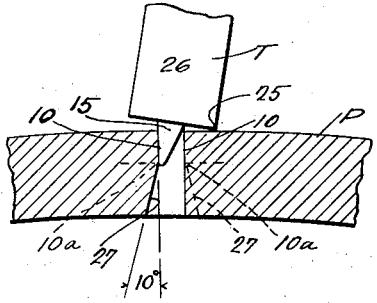
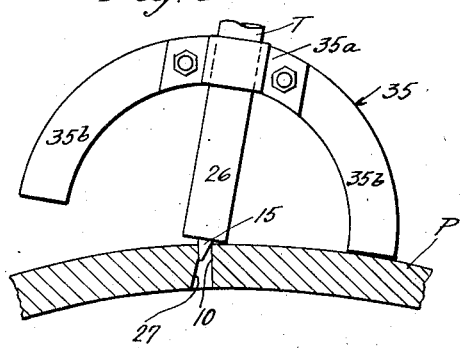
Inventor
William W. Wilson
Attorney.

Patented Mar. 26, 1929.

1,706,430

UNITED STATES PATENT OFFICE.

WILLIAM W. WILSON, OF LOS ANGELES, CALIFORNIA.

WELL-SCREEN MANUFACTURE.

Application filed April 26, 1927. Serial No. 186,803.

This invention relates to well screens or perforated pipe; and a general object of the invention is to provide a form of pipe perforation or slotting, and a method and apparatus producing the same, simple and economical.

Although the invention is not at all limited to being practiced in the field rather than in the shop, its simplicity and expedition lends itself very readily to the perforation or slotting of pipe in the field and at the place of use. It quite often happens that well screen is necessary in an emergency, and its manufacture and shipping, or even its shipping, from a place of storage often consumes so much time that valuable well production is lost, or that well operators are greatly inconvenienced. My method of perforating or slotting pipe is of such a character that the apparatus necessary for the purpose can be easily transported from place to place and the job of perforating or slotting can be as easily and expeditiously performed in the field as in the shop.

The characteristic features of my method may be briefly explained as follows: First I perforate a pipe with perforations of the desired size and shape, preferably elongated slots made with a milling cutter, saw or a high speed disk. This initial slot forms a guide for the subsequent operation of undercutting, which is preferably done with a cutting torch. The torch is so formed, with relation to the width of the initial slot, and is provided with such gauges or guides, that the torch can then be run along in the initial slot and will accurately cut out a part of the metal to form the desired undercut along the sides of the slot, and also, by cutting, increases the effective length of the slot; finally forming a straining slot of the most desirable shape for efficient straining and long wear.

The apparatus necessary for carrying on my method comprises a simple slotting apparatus of the character before indicated, and a cutting torch apparatus, all of which is easily transported if desired. The slotting apparatus may be in the form of a movable saw or slotting cutter saw or disk connected by a flexible shaft with a driving motor and thus capable of being moved around to the work. Likewise the cutting torch may be connected by flexible hose or tubing to the gas tanks, and be movable to the work. This arrangement of apparatus has obvious advantages for field work, the whole apparatus being capable of carriage on an automobile so that the work may be performed wherever the pipe may be without having to move the heavy pipe around. And even for manufacture of the screen in the shop, said form and arrangement of apparatus has the advantage that the heavy pipe does not have to be constantly moved to and from the machinery, or moved from time to time in the machine as the various spaced slots are cut.

All of this will be best understood from the following detailed description of a preferred and illustrative form of the invention, for which purpose I refer to the accompanying drawings, in which—

Fig. 1 is a fragmentary perspective illustrating the form of the initial slot;

Fig. 2 is a similar view illustrating the form of the final slot;

Fig. 3 is a fragmentary plan illustrating the use of the cutting torch;

Fig. 4 is a sectional elevation of the same;

Fig. 5 is an enlarged sectional elevation of parts shown in Fig. 4; and

Fig. 6 is a fragmentary perspective showing the form of the cutting torch.

The preferred form of perforation for straining purposes is an elongated slot; and although my invention is not necessarily restricted in its broader aspects to a perforation of that shape, yet that shape is more advantageous and has certain characteristic features over perforations of other shapes, and I therefore explain specifically the making of an elongated slot.

First I form a slot such as shown in Fig. 1. This slot may be formed with a thin milling cutter, a saw, or a high speed disk. However it is formed, it is preferably long and narrow and has two parallel side walls 10 and two curved end walls 11. The cut being made from the outside of the pipe with a circular cutter, the opening at the outside is considerably longer than that at the inside, as is clearly illustrated in Fig. 1.

Having formed this parallel walled slot, I next employ a torch T which has a nose 15 of suitable size and form to enter the slot as is shown in the several views. This nose 15 may preferably be wedge-shaped, the angle of the wedge depending upon the desired angle of undercut. For instance, suppose the desired angle of undercut is 10° as indicated in Fig. 5. The wedge shaped nose of the torch will then be preferably formed at this angle so that one face of the wedge can bear against one wall 10 of the slot, or at least so the end of the nose will bear against the side wall 10. With any given width of initial slot this wedge-shaped nose will enter the slot just so far, the opposite face of the nose bearing at the top of the corresponding side wall 10. The entry of the nose into the slot may thus be limited, or may be limited by the bearing of a corner 25 of the torch body 26 on the outside face of the pipe. The contact of the end of the torch nose with one side of the slot, together with the contact of the other side of the nose with the other side of the slot, or with the contact of corner 25 with the surface of the pipe, or with the contact on the surface of the pipe of such a guide member as shown at 26, will position the torch at the correct angle so that it will throw its cutting flame from the end of the nose at the determined angle of undercut. Being in this position, the cutting flame will undercut the inner part of the slot wall, back to the angular surface shown at 27. Then by simply moving the torch along the initial slot from end to end, then tilting the torch over to an opposite angular position and moving it back along the length of the slot, and at the end of its travel tilting it over to the initial position; the slot will be completely cut out to an inner outline such as indicated at 27ª in Figs. 2 and 3. The endwise travel of the torch is limited by the end of its nose striking the inclined end surfaces 11. When the torch nose strikes one of these surfaces then the torch is moved over to the opposite inclination, cutting along the end lines 27ᵇ and forming the end surface 27ᶜ of the finished slot.

Thus it will be seen that the shape of the finished slot is as shown in Fig. 2. The initial parallel side wall of the slot will be left down to such a depth as indicated at 10ª. Inside of that the side walls will be undercut as shown at 27. The initial end walls will be left down to the depth line indicated at 11ª, and inside of that line the end walls 27ᶜ will stand in planes at right angles to the axis of the pipe. Thus the finished slot will have an outer portion with parallel side walls, the width of this portion depending upon the determined width of the initial slot; and the depth (the dimension radially of the pipe) of this portion depending upon the distance the torch nose enters the initial slot. The end walls of the outside part of the finished slot, as shown at 11, will converge inwardly. The inner part of the slot has side walls that diverge inwardly and has parallel end walls.

Nothing that passes through the restricted outer portion of the slot can clog its inner portion, the inner part of the slot being free and open as compared with the outer part. However, I make the outer restricted part of the slot, with its parallel walls, of some considerable depth, so that the slot will not wear out to an increased width, as it would if the undercut walls extended to the outer surface of the pipe. For instance, if the total thickness of the pipe wall is about three-eighths of an inch, the radial depth of the parallel walled outer slot part may be three thirty-seconds of an inch or more.

The torch T will preferably have its gas orifices arranged in a single line, as shown in Fig. 6. For instance, if three orifices are used, the center one 30 will discharge oxygen and the two outer ones, 31, discharge acetylene. Guide 35 may be made in the simple form shown in Figs. 3 and 4, clamped around the body of the torch as shown at 35ª and having two arms 35ᵇ, either of which may be engaged with the surface of the pipe. Adjustment of the guide on the torch body enables the torch to be held at just the correct angle.

I claim:

1. The method of forming a straining slot through a pipe wall or the like, that includes first forming a parallel walled slot through the pipe wall, then undercutting said parallel slot walls with a cutting torch, using the initial slot as a guide for the cutting torch.

2. The method of forming a straining slot through a pipe wall or the like, that includes first forming a parallel walled slot through the pipe wall, then undercutting said parallel slot walls with a cutting torch, using the initial slot as a guide for the cutting torch, the torch being so formed that it will enter the initial slot at the predetermined angle of undercut.

3. The method of forming a straining slot through a pipe wall or the like, that includes first forming a parallel walled slot through the pipe wall, then undercutting the inner part of said parallel walls at a predetermined angle with a cutting torch that enters the initial slot a predetermined distance, and using the initial slot as a guide for the torch.

4. A method of forming a straining slot in a pipe wall or the like, that includes first cutting a slot through the pipe wall with a rotating cutter, said initial slot having parallel side walls and having curved end walls that converge inwardly, then undercutting said parallel side walls, and cutting away said converging end walls, from a predetermined depth line inwardly to the inner surface of the pipe wall, leaving the outer parts of the initial side and end walls intact.

5. A method of forming a straining slot in a pipe wall or the like, that includes first cutting a slot through the pipe wall with a rotating cutter, said initial slot having parallel side walls and having curved end walls that converge inwardly, then undercutting said parallel side walls, and cutting away said converging end walls, from a predetermined depth line inwardly to the inner surface of the pipe wall, leaving the outer parts of the initial side and end walls intact, the side walls being undercut at a predetermined angle by using a cutting torch whose nose enters the initial slot at said predetermined angle and enters inwardly to said predetermined depth line.

In witness that I claim the foregoing I have hereunto subscribed my name this 14th day of April, 1927.

WILLIAM W. WILSON.